(12) United States Patent
Kolomeitsev

(10) Patent No.: US 8,773,062 B2
(45) Date of Patent: Jul. 8, 2014

(54) POLYPHASE ELECTRIC MOTOR

(75) Inventor: Sergei Kolomeitsev, Rochester, MI (US)

(73) Assignee: Revolution Motor Technology, LLC, Tampa, FL (US)

( * ) Notice: Subject to any disclaimer, the term of this patent is extended or adjusted under 35 U.S.C. 154(b) by 331 days.

(21) Appl. No.: 13/326,726

(22) Filed: Dec. 15, 2011

(65) Prior Publication Data

US 2013/0076189 A1  Mar. 28, 2013

Related U.S. Application Data

(63) Continuation of application No. 13/246,932, filed on Sep. 28, 2011, now Pat. No. 8,093,857.

(51) Int. Cl.
*H02P 1/42* (2006.01)

(52) U.S. Cl.
USPC ............................ 318/754; 318/776; 318/777

(58) Field of Classification Search
USPC ......... 318/776, 777, 751, 752, 753, 754, 729, 318/771, 773, 775; 310/12.25, 49.23
See application file for complete search history.

(56) References Cited

U.S. PATENT DOCUMENTS

| | | | |
|---|---|---|---|
| 4,446,416 A | 5/1984 | Wanlass | |
| 4,808,868 A | 2/1989 | Roberts | |
| 4,959,573 A | 9/1990 | Roberts | |
| 5,563,777 A * | 10/1996 | Miki et al. | 363/37 |
| 5,883,487 A * | 3/1999 | Rosenzweig et al. | 318/781 |
| 7,034,426 B2 | 4/2006 | Goche | |
| 7,227,288 B2 | 6/2007 | Goche | |

OTHER PUBLICATIONS

Zipse, "Unity Plus Motor Winding Method Advantages and Disadvantages", Industrial and Commercial Power Systems Technical Conference, 1990, Conference Record, Papers Presented at the 1990 Annual Meeting, pp. 111-118.

Baghzouz et al., "Efficency of Dual-Winding Induction Motors with Integral Capacitors", Industrial and Commercial Power Systems Technical Conference, 1992, Papers Presented at the 1992 Annual Meeting, pp. 65-70.

Umans et al., "Modeling and Analysis of the Wanlass Three-Phase Induction Motor Configuration", IEEE Transaction on Power Apparatus and Systems, vol. PAS-102, No. 9, Sep. 1983, pp. 2912-2926.

Lyra et al., "Torque Density Improvement in a Six-Phase Induction Motor with Third Harmonic Current Injection", IEEE Trasactions on Industry Applications, vol. 38, No. 5, Sep./Oct. 2002, pp. 1351-1360.

* cited by examiner

*Primary Examiner* — Karen Masih
(74) *Attorney, Agent, or Firm* — Buchanan Ingersoll & Rooney PC

(57) ABSTRACT

A polyphase electric motor has a rotor, a stator with a plurality of slots, a plurality of main windings and a plurality of auxiliary windings installed in slots of the stator, and a main winding and an auxiliary winding that correspond to a selected phase of an alternating current power source. The auxiliary windings are connected to the motor terminals through a plurality of capacitors, and the auxiliary windings and corresponding capacitors are connected in parallel to the main windings. The main winding and the auxiliary winding of the selected phase are offset by about 60 to about 120 electrical degrees. A power of the plurality of main windings is at least 75% of a power of the polyphase electric motor at full load rating and the power of the plurality of main windings is motoring at 25% of the full load rating.

20 Claims, 9 Drawing Sheets

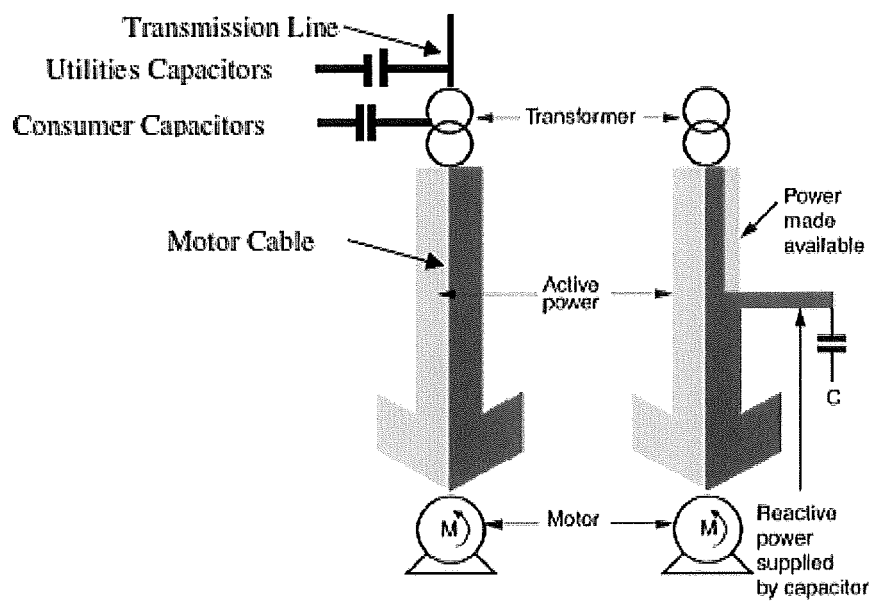
*FIG. 1a*   *FIG. 1b*
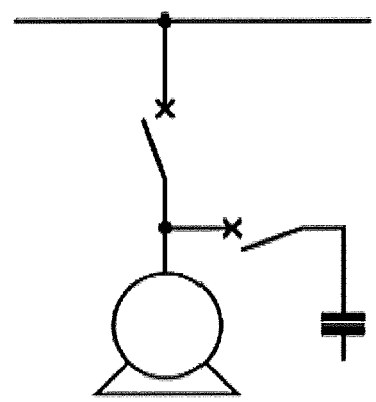
*FIG. 2*

POLYPHASE ELECTRIC MOTOR

CROSS-REFERENCE TO RELATED APPLICATIONS

This application is a continuation of U.S. patent application Ser. No. 13/246,932, filed Sep. 28, 2011 and claims the benefit thereof. The entirety of U.S. patent application Ser. No. 13/246,932 is incorporated by reference herein.

BACKGROUND OF INVENTION

1. Field of Invention

The invention relates to multiple phase electric induction machines, motors and generators. More particularly, the invention relates to an induction motor or generator that operates at a very high Power Factor over a broad range of loads without sacrificing important motor characteristics, such as efficiency and torque, while even improving some of these characteristics.

2. Description of Related Art

A three-phase AC Induction Motor is the primary motor type used in industrial applications. Induction motors consume 30% to 40% of the generated electrical energy worldwide, and up to 70% in certain developed nations. Because of their widespread use, the energy consumption parameters of induction motors are strongly regulated. Some of the parameters are controlled by particular standards. For example, motor efficiency is well appreciated, discussed, and controlled by the standards EPACT 92 and EISA 2007-MG1 Premium.

Another critically important energy consumption parameter is Power Factor ("PF"). PF is defined as the ratio of the amount of real power, in kW, consumed over the amount of apparent power, in KVA, consumed by a load. The combination of efficiency and PF defines the amount of current that a motor draws while it is running and producing a particular shaft power. The PF of induction motors has not yet been regulated by United States federal standards, even though induction motors are the primary creator of the reactive power demand, measured in units of Kilo-Volt Amperes Reactive ("kVAR"), in most electric utility systems. The most significant source for reactive power demand as kVAR for most, if not all electric utility systems, is created in large part by induction motors with poor PF. Many utilities charge a penalty to industrial consumers or similar consumers if the consumer's demand for reactive power exceeds certain thresholds. Many of these electric utilities penalize operators of motors with PF less than 0.95 to 0.85.

Another incentive to keep the PF of induction motors as high as possible is the effect of reactive power on transmission and distribution line losses. These losses are proportional to the square function of the total current which is in inverse proportion to the PF. The minimum threshold PF that a utility will tolerate from its customers is typically set by the utility. Minimum threshold PF values may vary from utility to utility, and by load and time of day.

TABLE 1

|  |  | Power Factor | | |
| --- | --- | --- | --- | --- |
| Power (hp) | Speed (rpm) | ½ load | ¾ load | full load |
| 0-5 | 1800 | 0.72 | 0.82 | 0.84 |
| 5-20 | 1800 | 0.74 | 0.84 | 0.86 |
| 20-100 | 1800 | 0.79 | 0.86 | 0.89 |
| 100-300 | 1800 | 0.81 | 0.88 | 0.91 |

A typical minimum threshold PF is 0.95. However, typical PFs of induction motors are significantly lower than 0.95 as shown in Table 1. Table 1 is taken from the website The Engineering Toolbox and is titled "PF for a Three Phase Electrical Motor," which is available at http://www.engineeringtoolbox.com/power-factor-electrical-motor-d_654.html. As can be seen in Table 1, PF varies with the motor load, and in most cases with modern induction motors PF declines when a motor is used below its full load parameters. Further, most induction motors operate at less than full load.

Today, the most common method of PF correction is to utilize a capacitor bank installation at an entrance point to a large plant or at a utility company's desired location. The cables between a source transformer and induction motors carry reactive power. The reactive power of the cables will increase losses in a cable in reverse proportion to the PF of a given induction motor. For example, 80% PF means 44% higher cable losses than at Unity PF. These cable losses can be very significant in comparison with motor's own losses and therefore improving motor PF is very important for overall energy savings. Therefore, it is important to not just consider a motor's own efficiency, but overall system efficiency where cable losses are included. Therefore system efficiency is defined in this document as motor output power divided by sum of motor input power plus cable losses.

As can be seen by the shaded arrow in FIGS. 1a and 1b, active power, or real power, consumed is the same in both cases shown in FIGS. 1a and 1b. In order to correct the PF of the motor shown, a local capacitor may be added as compensation. Adding the capacitor allows for more real power to be provided by the system in FIG. 1b.

There are several issues with the method of supplying reactive power to a motor through a local capacitor, including: 1) A transient current from the capacitor that is directly connected with the motor can trip the protective devices of the motor, especially since the full load settings of a compensated motor would be reduced versus when the motor is non-compensated. 2) Safety hazards may result from self-excitation of an induction motor, with medium to high inertia loads, immediately after the motor is de-energized (an additional relay switch is required to avoid these problems). 3) Capacitors directly connected to main power lines can multiply harmonic distortion issues because capacitor impedance for high harmonics is lower than for the fundamental frequency and harmonic issues are common with rectifiers or with variable speed drives. To solve this problem an expensive filter may be needed to correct these issues. 4) The variability of PF, especially with constantly changing motor loads, results in a need for consistent monitoring and adjustment of kVAR provided by the capacitors. The type of equipment to provide this monitoring and adjustment can be very expensive. 5) In the event that a local capacitor fails there may be a short circuit to ground. A short circuit of this type can result in a catastrophic failure for a capacitor bank installed in a utility application or in a locally installed application such as the one shown in FIG. 2.

Moreover, as the bulk of industrial motors are becoming more and more efficient the PF correction of motors becomes more critical. A newer, premium efficiency motor typically has a lower PF than the same size motor (in horsepower) of lower efficiency that is being replaced. If this trend is not addressed it may result in unintended consequences, including lower overall system efficiencies. Additionally, more capital improvements may be required due to necessary increases of cable sizes at plants because of the need to carry increased amounts of current required by motors with a low PF.

Some inventors have claimed to have solved the shortcomings of low PF and motor efficiency with a motor design having dual windings in a stator. One of the first examples of this technology is U.S. Pat. No. 4,446,416 to Wanlass, granted May 1, 1984, which is entitled "Polyphase Electric Machine Having Controlled Magnetic Flux Density." Wanlass suggests that by maintaining the magnetic flux density in a stator the foregoing disadvantages regarding efficiency and PF will be overcome. Wanlass discloses a stator core having main windings and additional control windings. In a single phase application, the main windings are connected in series with capacitors and in parallel to the control windings. This means that the control windings have a direct connection to the power source and the main windings and capacitors are connected in parallel to the control windings.

More particularly, in a polyphase example, Wanlass teaches that a main stator winding that is wound on a magnetic core and includes a plurality of main and control windings. Each winding represents a single phase of a polyphase system. Capacitors are connected in series to each of the main windings and are used to reduce reactive power demand of the motor. Wanlass claims that the flux density is optimized in a polyphase machine by controlling the flux density in the stator core with the windings.

Embodiments are disclosed with regard to the mutual superposition of the control and main windings in Wanlass, along with the resulting PF and efficiency for these embodiments. In addition, the Wanlass '416 patent provides data on power of the windings in relation with the motor load. Power is defined as electric power of certain winding on its terminals without consideration of core losses and mechanical losses of the motor. In the '416 patent an example of a 1 hp, 230 volt 3 phase electric motor having a 10 µF capacitor installed in series with each main winding is provided. Table number 2 below, has been made based on the data in Wanlass' patent found in column 10, lines 5-32.

TABLE 2

| Power of Control Winding (in Watts) | Power of Main Winding (in Watts) | Power Output of Motor (in Watts) | Shaft Power of Motor (in hp) | Output of Motor as Percentage of Full Load Rating of Motor | Motor Efficiency | Power of Control Winding as Percentage of Total Power of Motor |
|---|---|---|---|---|---|---|
| 368 W | 479 W | 847 W | 1 | 100.00% | 88.00% | 43% |
| −174 W | 504 W | 326 W | .341 | 34.10% | 78.00% | 53% (negative) |
| −390 W | 5010 W | 114 W | 057 | 5.70% | 37.30% | 325% (negative) |

For each of these outcomes the PF of the motor varied between 0.90 and 0.97.

Table 2 shows that with improper power-balance between the "main" and "control" windings, one of the windings acts as an internal brake to the motor. The power of the "control" winding, which is the winding that is directly connected to the power source, is negative in some instances. The '416 patent describes this situation as the "control" winding generating power, however, if a winding in an electric machine while its motoring operation is "generating," this actually means the winding is acting as internal brake. If a winding is acting as an internal brake, as the control winding does in the results shown in Table 2, this means that the other windings are working harder than necessary and are producing additional losses while delivering excessive power. When one winding is delivering too much power and the other is acting as a break, this is definitely not an optimum power-balance and this explains why the Wanlass design motor efficiency suffers.

Prior publications and actual physical tests point out a 2-4% efficiency reduction in the Wanlass design vs. the standard machine under light loads, and either no or slight efficiency gains under full load. (page 65, Baghzous and Cox 1992, and my FEA analysis). Furthermore, Wanlass' commentary in his patent displays his design having suboptimal power balance and significant breaking effect (column 10, line 5-32). Similar conclusions have being reached by other experts in the discussion section of the paper by Umans and Hess (1983), for example the FIG. F3 on page 2923.

In addition, another design for a motor with dual windings that was said to improve upon the winding disclosed by Wanlass is the "Unity Plus" winding method. The "Unity Plus" winding method is described as one of the embodiments of U.S. Pat. No. 4,808,868 ('868) to Gary D. Roberts described in the patent as a floating quasi-resonant concepts, however in publications it is almost always referred to as "Unity Plus" method. The other embodiment in the '868 patent is a "quasi-double resonant circuit" and we refer to this as Roberts throughout the document. The Unity Plus winding method includes two windings both of which are placed in the same stator slots. A first winding is connected to an electrical source and is located above a second winding, that is not connected to the electrical source, in the slot of the stator. Capacitors are mounted to the motor externally and are connected in parallel to the second winding.

Despite the claims made by those who advocate for the Unity Plus winding method as a way to increase motor efficiency, more than one author has noted that those claims seem dubious. In his paper titled "Unity Plus Motor Winding Method Advantages and Disadvantages," Donald Zipse states that "Some of the data offered by Unity Plus has indicated greater than 100 percent efficiency, which at this point in time, physical science has not achieved the perpetual motion machine. From this, one can assume the data is incorrect." (page 118, Zipse 1990). Zipse also describes how the Wanlass winding design failed to meet its claims of improved efficiency and the Unity Plus winding method came along in the 1980's to fill this void. Zipse states that the Unity Plus winding method was claimed to provide higher efficiency than the Wanlass winding, have close to a unity PF, and have higher starting and breakdown torque than the Wanlass winding, among other things.

Zipse found that the Unity Plus winding method did improve PF mostly due to the addition of capacitors with the motor windings. Despite the PF improvement, Zipse was clear to point out that a higher PF does not equal higher efficiency. Further, Zipse provides an example based on manufacturer reports that a motor that was rewound using the Unity Plus winding method actually had a lower efficiency than the original motor. Moreover, as cited in the Zipse paper, the amount of additional copper wire that was used by Unity Plus and Wanlass in some machines was as high as 59%.

Additionally, in the paper "Efficiency of Dual Winding Induction Motors With Integral Capacitors" by Y. Baghzouz and M. D. Cox, a standard electric motor was compared to a motor that had been rewound according to the Unity Plus winding method (in this article Unity Plus and Roberts are used interchangeably) and the Wanlass designs. Baghzouz and Cox ultimately concluded that the Unity Plus design did not improve efficiency over the standard motor. In fact, the efficiency of the motor proved to be worse over its entire operating range. They found this to be true even when the capacitor size was optimized for a given load. In addition, Baghzouz and Cox found that while both the Unity Plus method design and the Wanlass design achieved near unity PF. They said this could have been accomplished merely by adding shunt capacitors at the stator terminals without affecting the performance of the motor. Further, prior publications and the tests carried out in these publications point out a 2-4% efficiency reduction in the Wanlass design compared to a standard machine under light loads, and either no or slight efficiency gains under full load.

Further, another dual winding motor design is taught in U.S. Pat. No. 7,034,426 ('426 patent) and U.S. Pat. No. 7,227,288 ('288 patent) issued to Gerald Goche. The '426 and '288 patents describe similar motors. The '426 patent discloses an electric motor that is single or multiphase, with at least three phases, and has at least two poles. The electric motor also includes main windings and additional or de-saturation windings that are fed by at least one capacitor. Each additional winding is fed through a capacitor at a different phase angle and at a different field direction than each respective main winding. In addition the total cross section of wire used on each main and additional winding is a predetermined ratio. That ratio is approximately two-thirds for a main winding and one-third for an additional winding.

The '288 patent teaches that an electric motor has a main winding and an additional winding that are wound from different size conductors. The first conductor used to form the main winding has a greater size than the conductor used to form the additional winding. The number of turns of the additional winding is at least equal to half of the number of turns in the main winding. The number of turns in the additional winding may be equal to but not more than the main winding.

These patents claim to improve both the PF of the motor over a full range of loads and the efficiency of the motor. The '288 patent states that it teaches a motor that will cause a substantial drop in the starting and operating currents of the motor across all loads. Despite these claims, test results indicate that a motor configured in the fashion described in the '288 patent does not meet these claimed goals. As discussed below, a Goche design motor exhibits reduced motor efficiency at 100% of its rated load and this may lead to significant overheating and premature failure.

Furthermore, in the '288 patent, Goche describes the interaction between additional windings and main windings as being that which produces the undesired internal braking, similar to what we described above in reference to the Wanlass' design, "The first and second potential lines are electrically connected in parallel relation to the first and second main windings. The first and second additional windings generate a field in opposite direction relative to the field of the first and second main windings, respectively." According to this statement the power of an additional winding would be in an opposite direction of a main winding, and hence the power of one of the windings would be negative. In fact, whereas the power of the windings of Wanlass were only braking at light loads, as described above, the Goche auxiliary windings are generating, or the power is negative, at all loads.

As can be seen above, both Goche and Roberts fail to recognize the relationship between the power of a set the windings compared to the overall power of both sets of windings in a dual winding motor. Wanlass did provide an example of generation of one winding in a dual winding machine, however he failed to recognize the negative effect of this generation on motor performance. Furthermore, Wanlass' commentary in the '416 patent displays the significant braking effect that generation has on the efficiency of the motor. Similar conclusions have been reached as discussed in the article by Umans and Hess referenced above. Accordingly, there is a need for an induction motor design that would reduce motor cable losses by minimizing kVAR requirements, which is achieved with a high PF, without sacrificing, and even improving upon, efficiency and torque characteristics in both light and heavy loads as compared with standard motor design.

SUMMARY OF INVENTION

A polyphase electric motor is disclosed herein that has a rotor, a stator with a plurality of slots, a plurality of main windings installed in the plurality of slots of the stator, a first main winding of the plurality of main windings that corresponds to a selected phase of an available alternating current power source, a plurality of auxiliary windings installed in the plurality of slots of the stator, and a first auxiliary winding of the plurality of auxiliary windings also corresponds to the selected phase of the available alternating current power source.

Additionally, the plurality of auxiliary windings are connected to motor terminals of the polyphase electric motor through a plurality of capacitors and the plurality of auxiliary windings and the corresponding capacitors are connected in parallel to the plurality of main windings. The first main winding of the selected phase and the first auxiliary winding of the selected phase are offset by about 60 to about 120 electrical degrees.

Further, the capacitors and windings are sized and configured to provide a power of the plurality of main windings that is at least 75% of a total power of the polyphase electric motor at 100% of a full load rating of the polyphase electric motor and the power of the plurality of main windings is motoring at 25% of the full load rating.

In a preferred embodiment, the first main winding of the selected phase and the first auxiliary winding of the selected phase are offset by about 90 electrical degrees.

In another embodiment, the polyphase electric motor has each of a plurality of main windings and each of a plurality of auxiliary windings that have current flowing that creates a first, second, third, and fourth rotating Magnetomotive Force ("MMF"). The first MMF is created by a fundamental frequency current flowing in the main windings, the second MMF is created by a fundamental frequency current flowing in the auxiliary windings, the third MMF is created by interactions between the fundamental frequency currents flowing in the main windings and the fundamental currents flowing in the auxiliary windings, and the fourth MMF is created by interactions between a third harmonic frequency current flowing in the main windings and a third harmonic frequency current flowing in the auxiliary windings. Additionally, the first, second, third, and fourth MMF all rotate in the same direction.

In yet another embodiment, the ployphase electric motor is a three phase electric motor and the stator has 72 slots. Each one of the plurality of auxiliary windings is offset by 9 slots, which is about 90 electrical degrees, in relation to the associated main winding.

In still another embodiment, the ployphase electric motor is a three phase electric motor and the stator has 48 slots. Each one of the plurality of auxiliary windings is offset by 6 slots, which is about 90 electrical degrees, in relation to the associated main winding.

In a further embodiment, the plurality of main windings are installed closer to the backiron of the stator than the plurality of auxiliary windings in the slots of the stator.

In still a further embodiment, the plurality of auxiliary windings are installed closer to the backiron of the stator than the plurality of main windings in the slots of the stator.

In another embodiment, the electric motor further comprises a mechanical input device connected to the rotor enabling the electric motor to generate electricity.

In still a further embodiment, the plurality of main windings and the plurality of auxiliary windings are sized and configured such that when the polyphase electric motor is connected to the available alternating current power source the polyphase electric motor rotates in a clockwise direction.

In yet another embodiment, the plurality of main windings and the plurality of auxiliary windings are sized and configured such that when the polyphase electric motor is connected to the available alternating current power source the polyphase electric motor rotates in a counter clockwise direction.

Further disclosed herein is a method of making a polyphase electric motor. The method comprises placing a plurality of main windings into a plurality of slots of a stator, placing a plurality of auxiliary windings into the plurality of slots of the stator, installing a plurality of capacitors such that the plurality of auxiliary windings are connected to motor terminals of the polyphase electric motor through the plurality of capacitors, and installing the plurality of auxiliary windings and the corresponding capacitors in parallel to the plurality of main windings.

Further, a first main winding of the plurality of main windings corresponds to a selected phase lead of the polyphase electric motor and a first auxiliary winding of the plurality of auxiliary windings corresponds to the selected phase lead, and the first main winding and the first auxiliary winding are offset by about 60 to about 120 electrical degrees. In addition, the capacitors and windings are sized and configured to provide a power of the plurality of main windings that is at least 75% of a total power of the polyphase electric motor at 100% of a full load rating of the polyphase electric motor and the power of the plurality of main windings that is motoring at 25% of the full load rating.

Other details, objects, and advantages of the invention will become apparent as the following description of certain present preferred embodiments thereof proceeds.

BRIEF DESCRIPTION OF FIGURES

In the accompanying drawings I have shown certain present preferred embodiments of my electric motor in which:

FIG. 1a is an illustration of a prior art system with an electric motor prior to PF correction with a capacitor.

FIG. 1b is an illustration of the prior art system shown in FIG. 1 following PF correction with a capacitor.

FIG. 2 is an illustration of an electric motor connected to a power line with a switch installed in parallel between the power line and the electric motor which is known in the art.

DETAILED DESCRIPTION OF THE INVENTION

Figure 3:
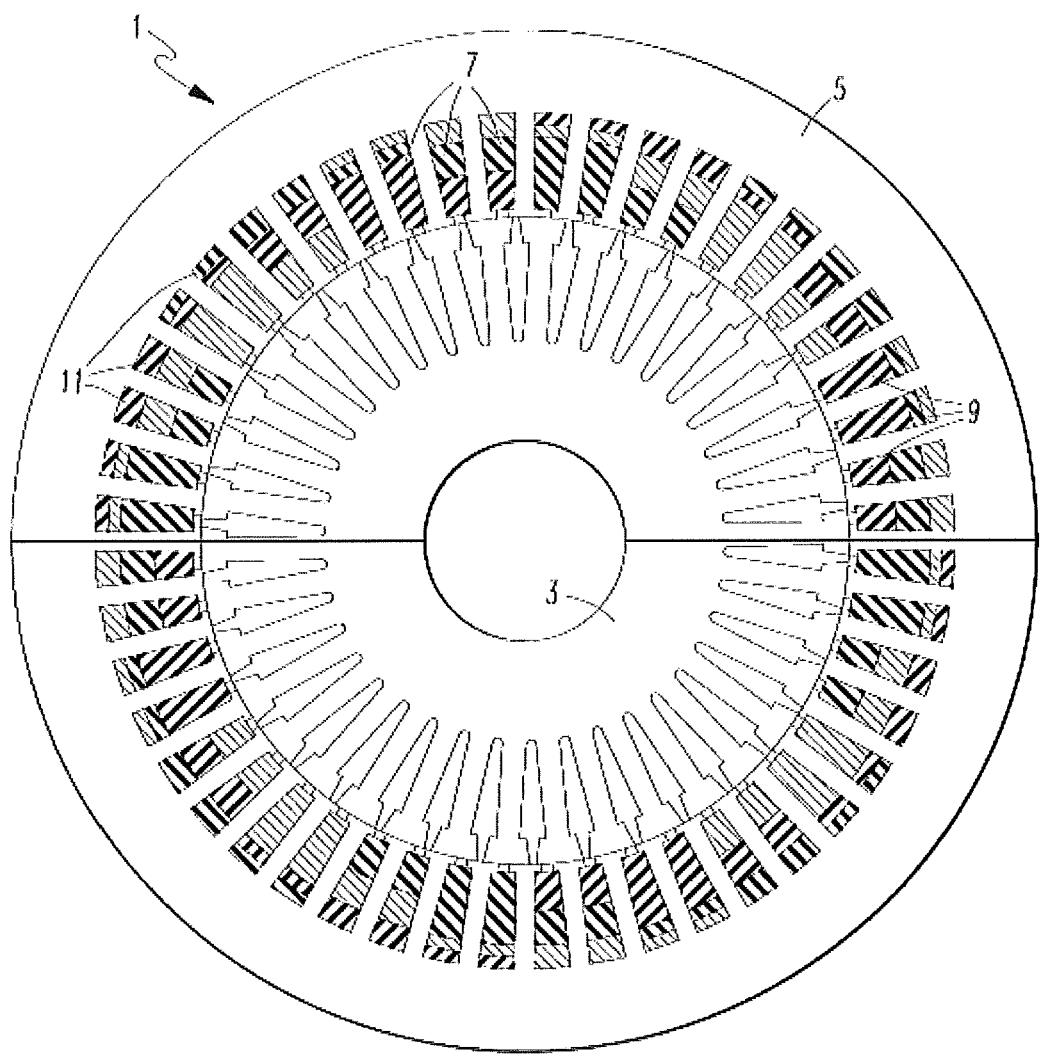
FIG. 3 is an end view of a present preferred embodiment of my electric motor.
Figure 4:
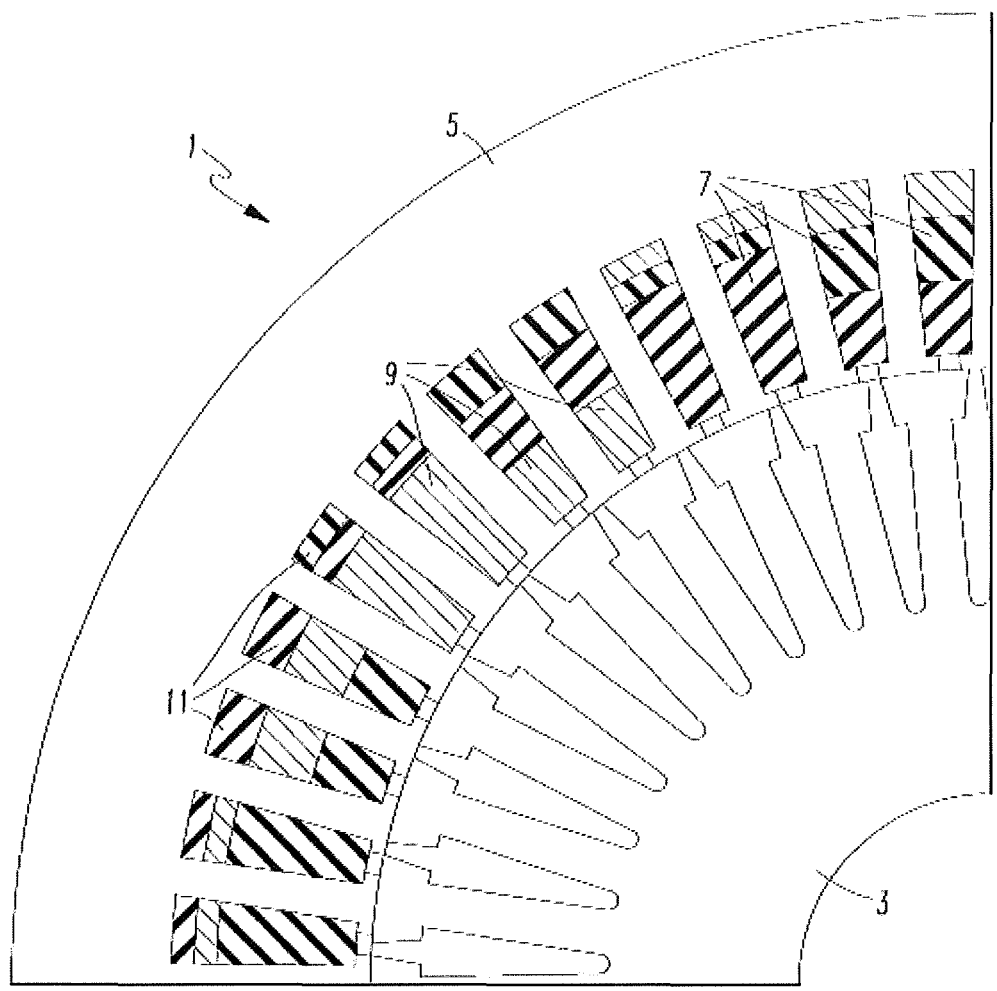
FIG. 4 is an enlarged view of a quarter section of the end view shown in FIG. 3.

According to FIGS. 3-8, the polyphase electric motor 1 has a rotor 3, a stator 5 with a plurality of slots 7, a plurality of main windings 9 installed in the slots 7, and a plurality of auxiliary windings 11 also installed in the slots 7. Each auxiliary winding 11 is associated with a main winding 9 based on a selected phase of a multiphase alternating current power source. This means an auxiliary winding and an associated main winding will have the same phase. Additionally, capacitors 13, as shown in the diagram of FIGS. 5-8, are placed in power supply lines and are connected to the plurality of auxiliary windings 11. More particularly, the plurality of auxiliary windings 11 are connected to the motor terminals through the capacitors 13, and the auxiliary windings 11 and the corresponding capacitors 13 are connected in parallel to the main windings 9.

In some embodiments, the windings 9, 11 are installed about the stator 5 such that the plurality of main windings 9 are wound about the stator 5 in the same direction as the plurality of auxiliary windings 11 and the number of turns of each of the main windings is the same as the number of turns of the auxiliary windings.

In addition, each auxiliary winding 11 is installed in the slots 7 of the stator 5 such that each auxiliary winding 11 of a selected phase may have a phase shift of 60 to 120 electrical degrees in relation to the associated main winding 9 of the same selected phase. To achieve optimal results, each auxiliary winding may have a shift of between 80 to 100, or in particular 90 electrical degrees in relation to each associated main winding.

Although I have described the offset as 60 to 120, 80 to 100, and 90 electrical degrees, those skilled in the art will recognize that it is not possible to obtain these exact angles every time. Manufacturing tolerances, and construction materials, among other things, can cause an electrical degree offset to vary by approximately 1 to 2 electrical degrees. Therefore, it should be understood that these numbers are target values and that a 60 to 120, 80 to 100, or 90 electrical degree offset will actually be about 60 to about 120, about 80 to about 100, or about 90 electrical degrees.

Furthermore, to achieve optimal results regarding PF and efficiency, a power of the plurality of main windings 11 may be at least 75% of a power of the electric motor 1 at the full load rating of the motor. Additionally, the power of the plurality of main windings is in a motoring mode at 25% of the full load rating of the motor. A motoring mode is indicated by a positive power and this is when a winding is converting electrical energy to mechanical energy. This is opposed to a generating mode which is when a winding is converting mechanical energy to electrical energy.

The electric motor 1 may have a selectable number of poles and pole pairs, and accordingly a selectable number of phases. As an example, the electric motor 1 is shown in FIGS. 5-8 as having three phases, A, B, and C, for the main windings 9 and having three corresponding phases, A', B', and C', for the auxiliary windings 11. Additionally, at least one phase of the main windings 9 may be installed coextensively in a slot with at least one phase of the auxiliary windings 11.

In addition to the rotating fields produced by the main and auxiliary windings, the superposition of each phase of the main and auxiliary windings by between 60 to 120 electrical degrees creates three fundamental two phase motor type interactions that improves the overall power conversion efficiency of the electric motor. In the case of a Delta-Delta motor connection methodology, the third harmonic, or so-called zero sequence circulating currents of the main and the auxiliary windings, also forms a quasi two-phase motor energy convergence. In a Wye-Wye motor connection, this third harmonic is not present.

In the example of the electric motor 1 shown in FIGS. 3-8, the three fundamental current frequency two phase motor type interactions would be between A and A', B and B', and C and C' main and auxiliary phase windings, respectively. Additionally, in the case of a Delta motor connection, the third harmonic, or so-called zero sequence circulating currents of the main and the auxiliary windings, also forms a quasi two phase motor energy convergence. The superposition of the fundamental and the third harmonic of magnetic flux create a favorable magnetic field distribution that can consequently increase motor torque capability and reduce core losses. This increased torque effect is a unique and inherent advantage of the design of the electric motor of the present invention. However, this third harmonic is not present in a Wye connection. It should also be noted that when a capacitor winding, or a "main winding" as disclosed by Wanless is connected in a delta configuration, the high impedance of the capacitors greatly reduces the third harmonic discussed above.

The currents flowing in the main and auxiliary windings create rotating Magnetomotive Forces ("MMF"). A first MMF is created by a fundamental frequency current flowing in the main windings, a second MMF is created by a fundamental frequency current flowing in the auxiliary windings, a third MMF is created by interactions between the fundamental frequency current flowing in the main windings and the fundamental current flowing in the auxiliary windings, and a fourth MMF is created by interactions between a third harmonic frequency current flowing in the main windings and a third harmonic frequency current flowing in the auxiliary windings. The first, second, third, and fourth MMFs all rotate in the same direction.

An advantage of installing the capacitor 13 as shown in FIGS. 5-8, is that if the capacitor fails, there will not be a short circuit to ground during a possible failure of the capacitor bank. This avoids the type of catastrophic failure that can result during a short circuit of a capacitor bank installed in a utility application or in a locally installed application such as the one shown in FIG. 2.

Further, capacitor values are selected so as to achieve close to unity PF by offsetting the magnetization current of the main winding at full load. Typically in an electric motor, a larger number of poles equals a higher magnetization current and magnetization current is a function of many machine parameters such as core saturation, air gap length, etc. This means that the size of the capacitor will be optimized depending on these parameters. In addition, a formula for estimating the size of a capacitor when converting from a standard motor to a dual winding motor is:

$$X_c = \frac{2 \times V_{L-L}}{\sqrt{3} \times \sqrt{(I_{nom}^2 - (I_{nom} \times PF)^2)}}$$

$$C = \frac{1}{2 \times \pi \times f \times X_c}$$

Where $V_{L-L}$ is the line voltage in RMS, $I_{nom}$ is the nameplate nominal current of the motor, PF is the standard motor PF (prior to conversion to a dual winding motor), and f represents the frequency of the voltage supplied to the motor.

Moreover, the specified capacitor size and the number of turns in the main and auxiliary windings are important parameters for determining the system efficiency and PF of the electric motor. It is known that the power of the main and power of the auxiliary windings are determined at least in part based on the specified capacitor size and the number of turns in the main and auxiliary windings. Therefore, the system efficiency and PF depend on the power of the main and auxiliary windings. The relationship between the power of the windings and system efficiency and PF is most easily illustrated by representing the power of one set of windings, the main windings for example, as a percentage of the overall power of the electric motor. The electric motor's system efficiency and PF can be presented as a function of this percentage. System efficiency of a motor is defined as the ratio of motor output power over the sum of the motor's input power and the motor cable losses. Therefore, system efficiency is a measure of efficiency of the electric motor and cables attached. Additionally, the motor efficiency is a measure of an efficiency of the electric motor based on input power at the terminals of the motor with the cable losses excluded.

Figure 9:
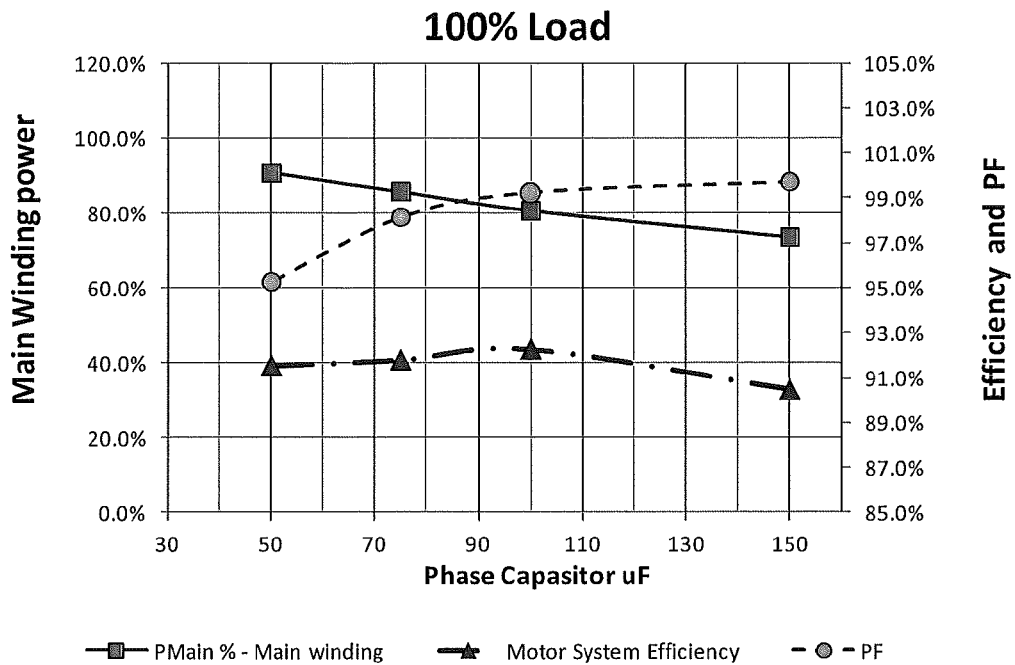
FIG. 9 is a graph of the power of the main windings of a preferred embodiment of the electric motor compared with system efficiency and PF of the electric motor at 100% nominal load.
Figure 10:
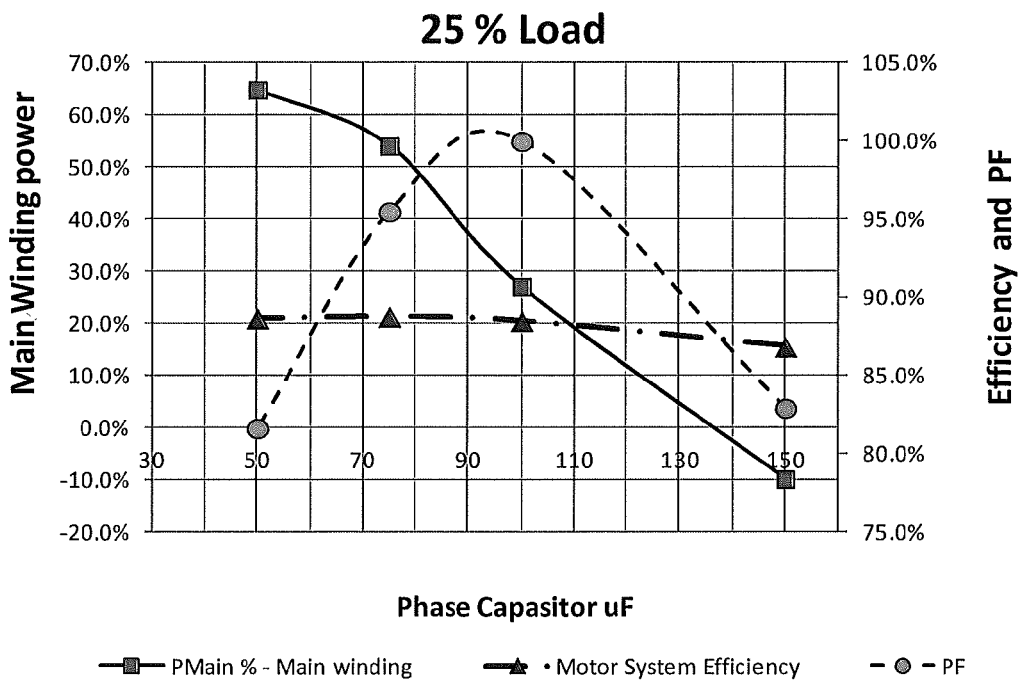
FIG. 10 is a graph of the power of the main windings of a preferred embodiment of the electric motor compared with system efficiency and PF of the electric motor at 25% nominal load.

FIGS. 9 and 10 demonstrate the effect that various sizes of capacitors have on the motor system efficiency and PF of an electric motor of the present invention. In that example, a 50 hp, four pole electric motor has a 90 electrical degree offset between the main and auxiliary windings. The number of turns in the main and auxiliary windings are held constant at 13.

Further, Tables 3a and 3b show the data points used in the graphs of FIGS. 9 and 10. PMain is the power of the main windings and PAux is the power of the auxiliary windings. A cable parameter is included in the system efficiency calculation that simulates the connection that a motor has in the field and is modeled according to National Electric Code ("NEC") standard of 3% maximum voltage drop.

TABLE 3a

100% of Full Load Rating

| Capacitor size, in uF | System Eff. | Motor Eff. | System PF | PMain (in Watts) | PAux (in Watts) | PMain (as Percentage of Total Power) |
|---|---|---|---|---|---|---|
| 150 | 90.5% | 92.4% | 0.997 | 30,665 | 11,004 | 73.6% |
| 100 | 92.3% | 94.3% | 0.993 | 30,006 | 7,206 | 80.6% |
| 75 | 91.8% | 93.9% | 0.982 | 31,894 | 5,327 | 85.7% |
| 50 | 91.5% | 93.7% | 0.953 | 33,788 | 3,462 | 90.7% |

TABLE 3b

25% of Full Load Rating

| Capacitor size, in uF | System Eff. | Motor Eff. | System PF | PMain (in Watts) | PAux (in Watts) | PMain (as Percentage of Total Power) |
|---|---|---|---|---|---|---|
| 150 | 86.8% | 87.7% | 0.829 | 1,033 (negative) | 11,531 | 9.8% (negative) |
| 100 | 88.5% | 89.0% | 1.000 | 2,804 | 7,550 | 27.1% |
| 75 | 88.7% | 89.4% | 0.955 | 5,580 | 4,736 | 54.1% |
| 50 | 88.6% | 89.4% | 0.816 | 6,677 | 3,623 | 64.8% |

As can be seen in FIG. 9, increasing the capacitor size between 50 μF to 150 μF. at 100% of the nominal or nameplate load rating of the motor causes PMain to vary between 90.7% and 73.6% of the total power in the windings of the electric motor. Additionally, increasing capacitor size causes an increase in the PF of the motor, however, the system efficiency of the motor goes up to an extent and then goes down for capacitor values above 100 μF. This shows that an optimal output power of the main windings is at or above 75% of the total output power of the motor at 100% of its full load rating.

FIG. 10 shows the relationship between the power of the main winding ("PMain") and system efficiency and PF at 25% of the electric motor's nominal load. PMain generally decreases for values of the capacitor between 50 μF and 100 μF. However, PMain decreases at a steep rate for capacitor values above 100 μF. Further, system efficiency generally decreases as the size of the capacitor increases and the PF is around a peak for a 100 μF capacitor.

It is important to note that at 150 μF, PMain is negative. The reason PMain is negative is because the auxiliary windings are producing more output than required by the load. The reason for this situation is that the power of the auxiliary windings, because of the capacitors' high impedance, is varying very little with the change of the motor shaft load. Therefore in order to have a power balance in cases when auxiliary winding power is exceeding the motor load, the main winding power becomes negative, or the main winding acts as an internal brake. This means that the main windings of the motor are generating instead of motoring.

The system efficiency and PF at this point are low and therefore a capacitor of this size, 150 μF, is not conducive to the goal of high PF along with an acceptable system efficiency. Thus an optimal result at 25% of the full load rating is achieved when the power of the main windings is at or above 0% of the total power of the windings of the motor. It should be noted that a 25% load rating is used in my analysis because a 25% test is the lightest protocol test load according to the IEEE 112b standard. Very few motors operate at less than a 25% load rating.

Additionally, it is known in the art how to vary the number of turns in the auxiliary windings and the capacitor size to produce a specific power at the terminals of the main windings. Therefore it is known how to produce auxiliary windings and corresponding capacitors connected between the power source and the auxiliary windings that provide a power that is a specific percentage of the total power of a motor. Table 4 provides an example showing that the number of turns may be varied as well as the capacitor size in order to produce a power from the main windings that results in a desirable PF and efficiency.

TABLE 4

| | Capacitor (in μF) | System Eff. | Motor Eff. | System PF | PMain (in Watts) | PAux (in Watts) | PMain (as Percentage of Total Power) |
|---|---|---|---|---|---|---|---|
| Auxiliary Winding Number of Turns are the same as Main Winding Number of Turns = 13 | 75 | 91.80% | 93.90% | 0.982 | 15,947 | 2,664 | 85.70% |
| Auxiliary Winding Number of Turns = 15, and Main Winding Number of Turns = 13 | 65 | 91.80% | 93.80% | 0.982 | 15,984 | 2,586 | 86.10% |

In the example shown in the first row of Table 4, the number of turns in the main windings are the same as the number of turns in the auxiliary windings, 13. The power of the main windings is 85.7% of the overall power of the windings of the motor and the system efficiency and the PF are 91.8% and 0.982, respectively. In the next example in Table 4, the number of turns in the auxiliary windings is 15, while the number of turns in the main windings is 13. The capacitor size has been changed to 65 μF and the main windings produce a similar power as before, this time 86.1% of the total power of the electric motor. Accordingly, the system efficiency and the PF are the same as before, 91.8% and 0.982, respectively.

The full range of combinations of the capacitor size and number of turns in the windings to produce a power of the main windings that is at or above 75% of the total power of the windings of the motor at 100% of its full load rating and that is motoring at 25% of its full load rating is not provided since it is within the skill of one in the art.

In addition, the direction of rotation of the rotor may be most efficiently reversed by changing certain connections in the electric motor. Because of the two phase motor type interactions described above, reversing the rotation of the rotor is accomplished by swapping the phase leads at the power source accompanied by reversing all of the leads of the auxiliary windings or by reversing all leads of the main winding.

Figure 5:
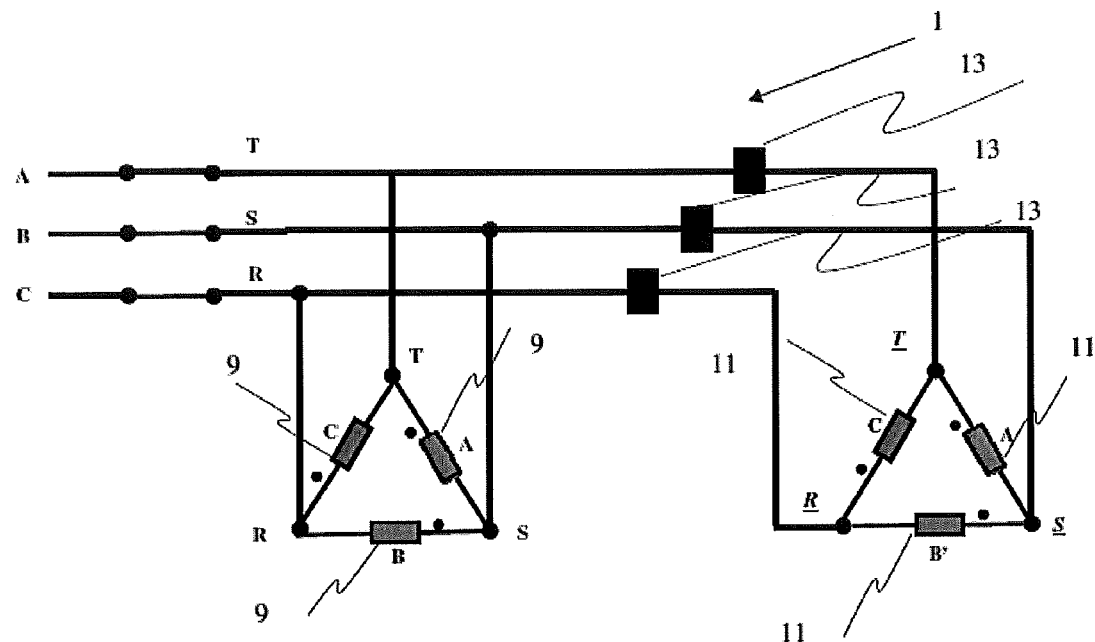
FIG. 5 is an example of a Delta winding connection diagram for the electric motor shown in FIG. 3 that provides clockwise rotation of the electric motor.
Figure 6:
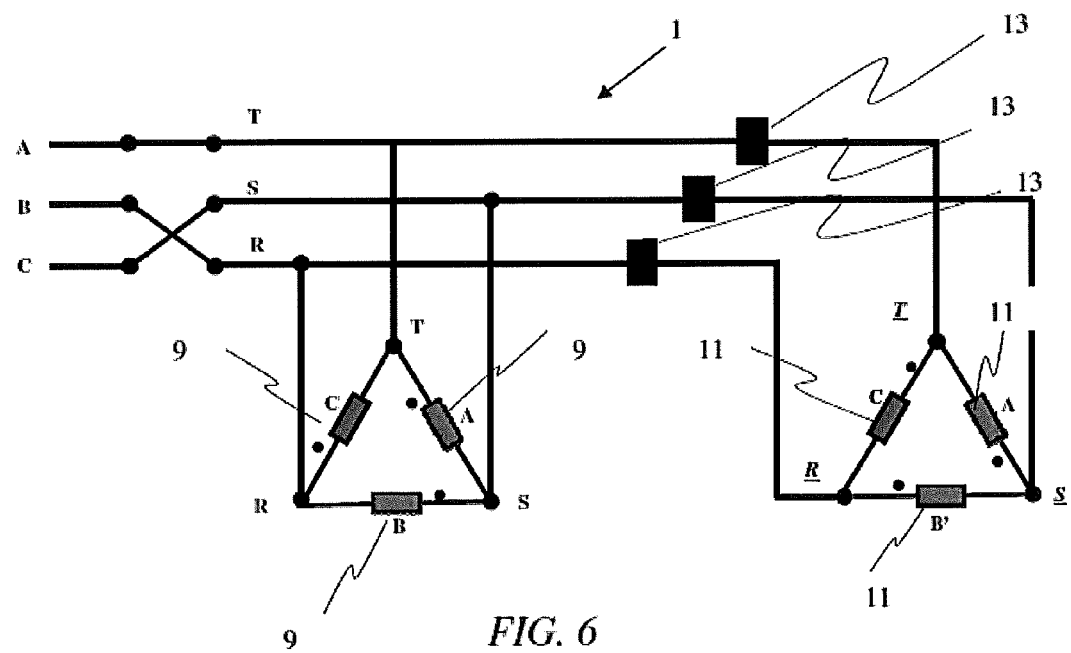
FIG. 6 is an example of a Delta winding connection diagram for the electric motor shown in FIG. 3 that provides counter clockwise rotation of the electric motor.
Figure 7:
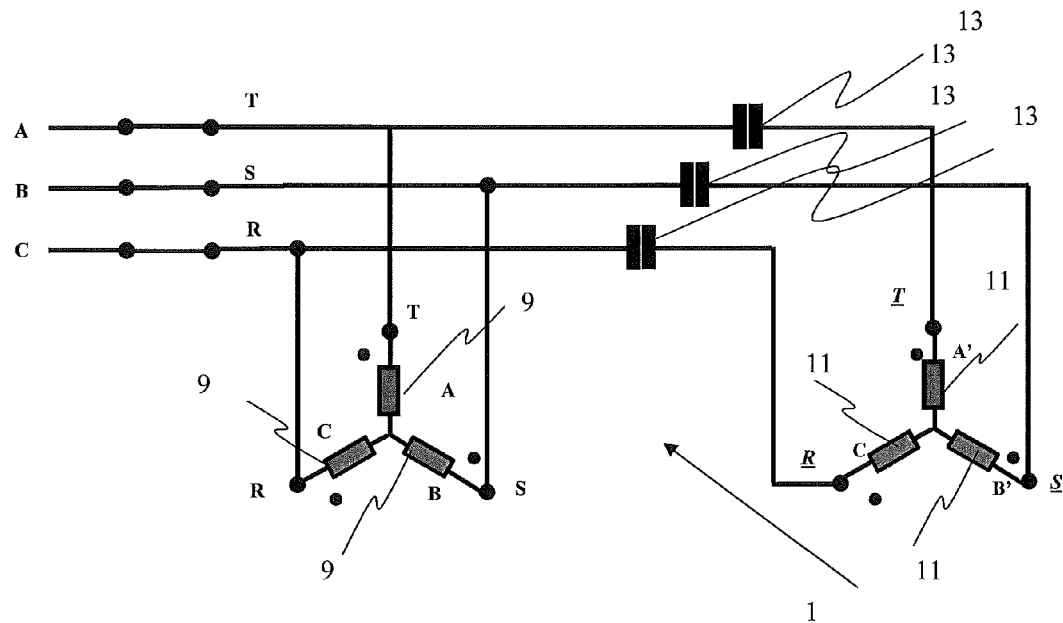
FIG. 7 is an example of a Wye winding connection diagram for the electric motor shown in FIG. 3 that provides counter clockwise rotation of the electric motor.
Figure 8:
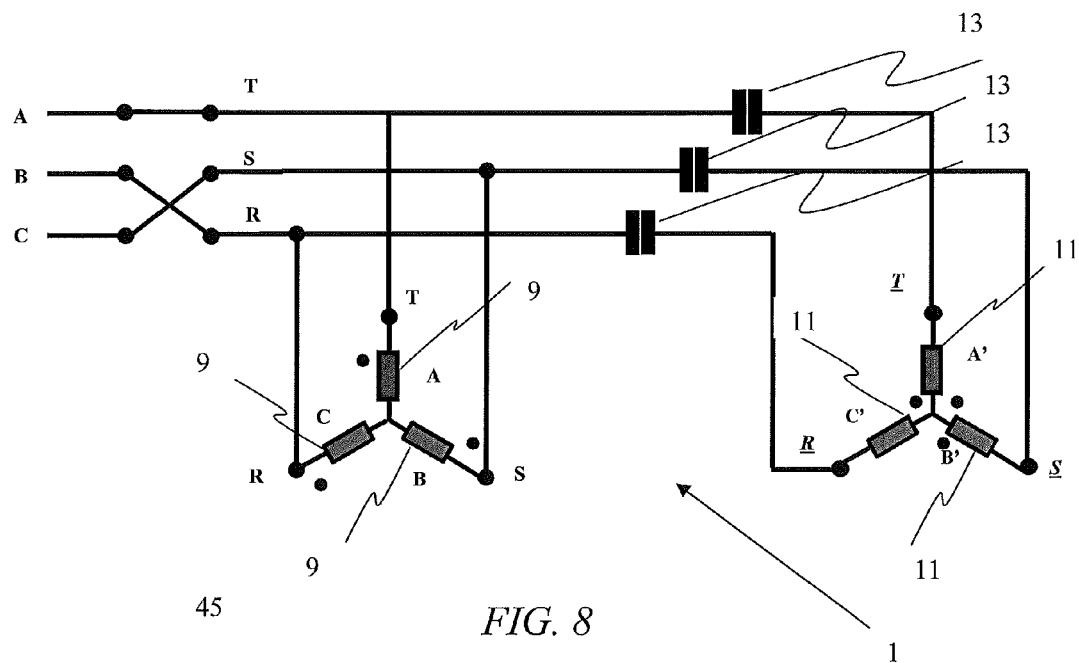
FIG. 8 is a an example of a Wye winding connection diagram for the electric motor shown in FIG. 3 that provides clockwise rotation of the electric motor.

This principle is shown in FIGS. 5-8, where a dot is shown to illustrate the start, or magnetic polarity, of each of the windings. As an example, reversing the rotation of the rotor may be done by swapping two phases in a three phase electric motor at the power source along with the leads to the auxiliary windings as shown in comparison between FIG. 5 and FIG. 6. The examples in FIGS. 5 and 6 demonstrate a Delta connection configuration. FIG. 5 is an example of a Delta configuration that provides counter clockwise rotation of the electric motor 1. The direction of rotation of the magnetic fields created by the three phase main and auxiliary windings is in the same direction as the first and second two-phase rotating fields. The first two-phase field is created by the interaction between corresponding phases of the main and auxiliary windings and the second two-phase field is created by the interaction between the third harmonic currents circulating in the main and auxiliary Delta connections. Similarly, FIG. 7 is an example of a Wye configuration that provides for counter clockwise rotation of the electric motor 1.

FIG. 6 is an example of a Delta configuration that provide clockwise rotation of the electric motor. As shown in FIG. 6, the connection of the motor terminals to the power source leads may be swapped. The source lead C will be connected to the S motor terminal instead of the R terminal, the source lead B will be connected to the R motor terminal instead of the S terminal, and the source lead A of the power source remain connected to the T motor terminal. All start and finish leads of the auxiliary winding connections have been inverted. The start of the C phase auxiliary winding is now connected to the T motor terminal instead of the R motor terminal. The start of the B phase auxiliary winding is now connected to R motor terminal, and the start of the A phase auxiliary winding is connected to the S motor terminal. Similarly, FIG. 8 demonstrates an example of a Wye configuration that provides clockwise rotation of the electric motor.

The reason that the auxiliary windings must also be changed is that the two-phase motor type interactions, or two-phase torque components, are defined by the relative magnetic polarity of the corresponding main and auxiliary phases. When the three phase torque is reversed by swapping the motor terminal connections to the power source, the relative polarity of corresponding phases must be changed to reverse polarity of the two-phase torque components.

Changing the polarity of the auxiliary winding is preferred since it normally carries lower current and lighter gauge leads. Therefore, while the present invention permits reversing of the rotation of the motor by swapping the power source connections, all start and finish leads of the auxiliary winding connections should be inverted for optimal results.

To form a three phase, four pole electric motor with a stator having 48 slots, an example for the winding slot distribution is provided in Tables 5a-5f. Tables 5a and 5b describe the location of the A phase main and auxiliary windings, Tables 5c and 5d describe the location of the B phase main and auxiliary windings, and Tables 5e and 5f describe the location of the C phase main and auxiliary windings.

TABLE 5a

A - Main

| Coil Polarity | Main Winding | | |
|---|---|---|---|
| | Coil | Go -Slot# | Return |
| +A main | 1 | 7 | 17 |
| | 2 | 8 | 18 |
| | 3 | 9 | 19 |
| | 4 | 10 | 20 |
| −A main | 5 | 19 | 29 |
| | 6 | 20 | 30 |
| | 7 | 21 | 31 |
| | 8 | 22 | 32 |
| +A main | 9 | 31 | 41 |
| | 10 | 32 | 42 |
| | 11 | 33 | 43 |
| | 12 | 34 | 44 |
| −A main | 13 | 43 | 5 |
| | 14 | 44 | 6 |
| | 15 | 45 | 7 |
| | 16 | 46 | 8 |

TABLE 5b

A - Auxiliary

| Coil Polarity | Auxiliary Winding | | |
|---|---|---|---|
| | Coil | Go -Slot# | Return |
| +A aux | 1 | 1 | 11 |
| | 2 | 2 | 12 |
| | 3 | 3 | 13 |
| | 4 | 4 | 14 |
| −A aux | 5 | 13 | 23 |
| | 6 | 14 | 24 |
| | 7 | 15 | 25 |
| | 8 | 16 | 26 |
| +A aux | 9 | 25 | 35 |
| | 10 | 26 | 36 |
| | 11 | 27 | 37 |
| | 12 | 28 | 38 |
| −A aux | 13 | 37 | 47 |
| | 14 | 38 | 48 |
| | 15 | 39 | 1 |
| | 16 | 40 | 2 |

TABLE 5c

B - Main

| Coil Polarity | Main Winding | | |
|---|---|---|---|
| | Coil | Go -Slot# | Return |
| +B main | 1 | 15 | 25 |
| | 2 | 16 | 26 |
| | 3 | 17 | 27 |
| | 4 | 18 | 28 |
| −B main | 5 | 27 | 37 |
| | 6 | 28 | 38 |
| | 7 | 29 | 39 |
| | 8 | 30 | 40 |
| +B main | 9 | 39 | 1 |
| | 10 | 40 | 2 |
| | 11 | 41 | 3 |
| | 12 | 42 | 4 |
| −B main | 13 | 3 | 13 |
| | 14 | 4 | 14 |
| | 15 | 5 | 15 |
| | 16 | 6 | 16 |

TABLE 5d

| Coil Polarity | Coil | Auxiliary Winding Go -Slot# | Return |
|---|---|---|---|
| +B aux | 1 | 9 | 19 |
|  | 2 | 10 | 20 |
|  | 3 | 11 | 21 |
|  | 4 | 12 | 22 |
| −B aux | 5 | 21 | 31 |
|  | 6 | 22 | 32 |
|  | 7 | 23 | 33 |
|  | 8 | 24 | 34 |
| +B aux | 9 | 33 | 43 |
|  | 10 | 34 | 44 |
|  | 11 | 35 | 45 |
|  | 12 | 36 | 46 |
| −B aux | 13 | 45 | 7 |
|  | 14 | 46 | 8 |
|  | 15 | 47 | 9 |
|  | 16 | 48 | 10 |

TABLE 5e

C - Main

| Coil Polarity | Coil | Main Winding Go -Slot# | Return |
|---|---|---|---|
| +C main | 1 | 23 | 33 |
|  | 2 | 24 | 34 |
|  | 3 | 25 | 35 |
|  | 4 | 26 | 36 |
| −C main | 5 | 35 | 45 |
|  | 6 | 36 | 46 |
|  | 7 | 37 | 47 |
|  | 8 | 38 | 48 |
| +C main | 9 | 47 | 9 |
|  | 10 | 48 | 10 |
|  | 11 | 1 | 11 |
|  | 12 | 2 | 12 |
| −C main | 13 | 11 | 21 |
|  | 14 | 12 | 22 |
|  | 15 | 13 | 23 |
|  | 16 | 14 | 24 |

TABLE 5f

C - Auxiliary

| Coil Polarity | Coil | Auxiliary Winding Go -Slot# | Return |
|---|---|---|---|
| +C aux | 1 | 17 | 27 |
|  | 2 | 18 | 28 |
|  | 3 | 19 | 29 |
|  | 4 | 20 | 30 |
| −C aux | 5 | 29 | 39 |
|  | 6 | 30 | 40 |
|  | 7 | 31 | 41 |
|  | 8 | 32 | 42 |
| +C aux | 9 | 41 | 3 |
|  | 10 | 42 | 4 |
|  | 11 | 43 | 5 |
|  | 12 | 44 | 6 |
| −C aux | 13 | 5 | 15 |
|  | 14 | 6 | 16 |
|  | 15 | 7 | 17 |
|  | 16 | 8 | 18 |

Furthermore, one of ordinary skill would know how to adapt this winding slot distribution for a three phase electric motor with a stator having 72 slots or other variation of slots and a variety of pole pairs. In addition, either the auxiliary windings or the main windings may be closer to the backiron of the stator. Hence, the auxiliary windings may be installed in the slots before or after the main windings are installed in the slots.

Further, like most electric machines, the electric motor of the present invention may comprise a mechanical input device connected to the rotor, which enables the electric motor to generate electricity. The mechanical input device, for example, may consist of a shaft, a gear, or any other type of device that can transmit force and cause the rotor to turn. This enables the electric motor of the present invention to be used in the generation of electricity from sources such as coal, natural gas, or any other forms of generation that rely on mechanical input to a generator.

As illustrated in Table 6, in some slot-pole combinations it is impossible to achieve exactly a 90 electrical degree offset between the main and auxiliary windings. For example, in a 2 pole electric motor having a stator that with 36 slots, 90 electrical degrees is 4.5 slots. In that case, a shift of 4 or 5 slots between the main and auxiliary windings can be used. This would constitute a shift of between 80 and 100 electrical degrees. While this is not the optimal offset of 90 electrical degrees, it is as close to that optimal offset they may be accomplished for that particular design.

TABLE 6

| Pole Pairs | | | | | | | | | | |
|---|---|---|---|---|---|---|---|---|---|---|
| 1 | | 2 | | 3 | | 4 | | 5 | | |
| Stator Slots | 90 deg. Aux. Angle | Stator Slots | 90 deg. Aux. Angle | Stator Slots | 90 deg. Aux. Angle | Stator Slots | 90 deg. Aux. Angle | Stator Slots | 90 deg. Aux. Angle |
| 6 | 1.5 | 12 | 1.5 | 18 | 1.5 | 24 | 1.5 | 30 | 1.5 |
| 12 | 3 | 24 | 3 | 36 | 3 | 48 | 3 | 60 | 3 |
| 18 | 4.5 | 36 | 4.5 | 54 | 4.5 | 72 | 4.5 | 90 | 4.5 |
| 24 | 6 | 48 | 6 | 72 | 6 | 96 | 6 | 120 | 6 |
| 30 | 7.5 | 60 | 7.5 | 90 | 7.5 | 120 | 7.5 | 150 | 7.5 |
| 36 | 9 | 72 | 9 | 108 | 9 | 144 | 9 | 180 | 9 |
| 42 | 10.5 | 84 | 10.5 | 126 | 10.5 | 168 | 10.5 | 210 | 10.5 |
| 48 | 12 | 96 | 12 | 144 | 12 | 192 | 12 | 240 | 12 |

An electric motor according to the above description overcomes many shortcomings of dual winding designs attempted by previous inventors. While several previously published designs achieved near unity PF, they all failed to be as efficient as a standard design AC induction motor. Some of them, like the Roberts design, demonstrated lower efficiency than standard design at both rated and light loads. Others, like Wanlass, demonstrated comparable efficiency at rated loads, but significantly lower efficiency at reduced loads in comparison to standard design. Furthermore, others like Goche, while demonstrated some efficiency gain at light loads, display dramatic efficiency reduction at full load—which can lead to the motor's premature failure.

Figure 11:
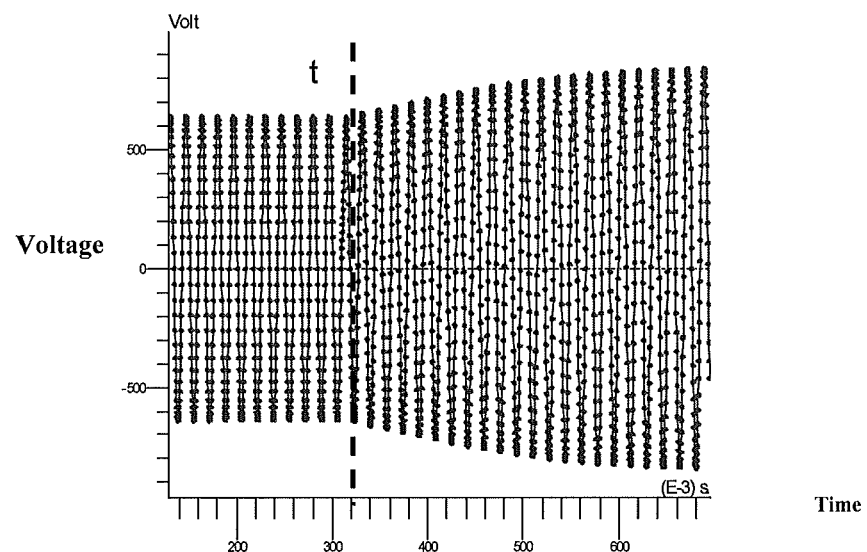
FIG. 11 is a graph of the self-excitation voltage of a prior art electric motor disclosed by Wanlass.
Figure 12:
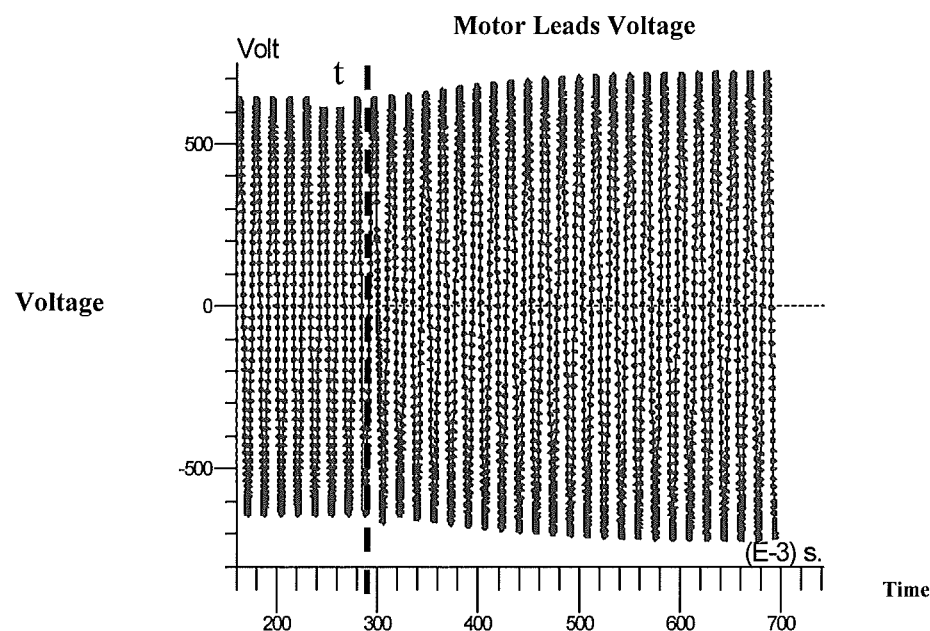
FIG. 12 is a graph of the self-excitation voltage of a prior art electric motor disclosed by Goche.

Another detrimental aspect of the Wanlass and Goche designs is a potentially dangerous rise of voltage at the winding terminals, or self-excitation. This is similar to the self excitation phenomena described in traditional PF correction by capacitors connected in parallel with conventional induction motors illustrated in FIG. 2. FIG. 11 shows the self excitation voltage that is exhibited by a motor embodying the Goche design. As can be seen in FIG. 11, following time t at which the motor is turned off there is a concerning rise in voltage. Similarly, FIG. 12 shows the self excitation voltage that is exhibited by a motor embodying the Wanlass design. This can be seen as an increase in the amplitude as time increases past the demarcated time t. While the voltage rise shown in FIG. 12 associated with the Wanlass design is not as great as the voltage rise of the Goche design, there is still a moderate amount of self-excitation present.

Figure 13:
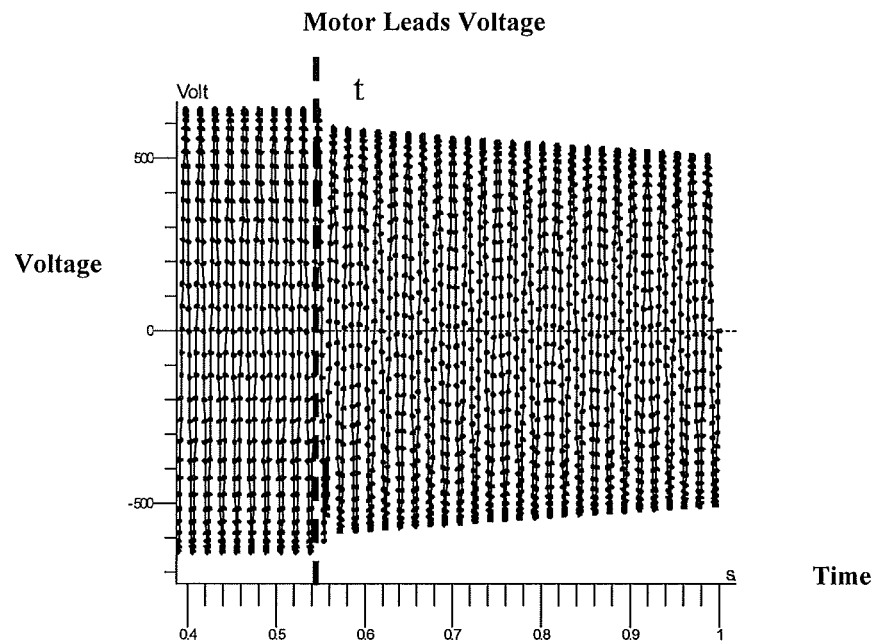
FIG. 13 is a graph of the self-excitation voltage of an embodiment of my electric motor.

As can be seen in FIG. 13, the electric motor of the present invention does not produce the same self-excitation phenomenon that is exhibited by both the Wanlass and Goche designs. While the self-excitation phenomenon can cause problems for maintenance personnel, it also causes stress on the capacitors. FIG. 13 shows that following a time t when the electric motor is turned off there is no rise in voltage over the voltage that the electric motor had while it was running. This can be seen as the amplitude of the voltage decreasing as time increases following the demarcated time t.

Tables 7a and 7b report the results of a Finite Element Analysis ("FEA") comparing an embodiment of the present invention (represented by "D100" and "D25" for 100% and 25% loading, respectively) to an standard electric motor (represented by "R100" and "R25" for 100% and 25% loading, respectively), an electric motor as taught by the '288 patent (represented by "G100" and "G25" for 100% and 25% loading, respectively), the Goche design, an electric motor as taught by the '416 patent, the Wanlass design (represented by "W100" and "W25" for 100% and 25% loading, respectively), and an electric motor as taught by the '868 patent, the Roberts or Unity Plus design (represented by "Rbrt100" and "Rbrt25" for 100% and 25% loading, respectively).

The FEA tests include measurements of motor input power, motor output power, motor cable losses, motor efficiency, system efficiency, PF, current draw, RPM, capacitor voltage, and losses in the components of the motor and the motor as a whole. Cables in the FEA tests were modeled according to the NEC standard of 3% maximum voltage drop. Further, the FEA tests were performed at 25% and 100% of the rated horsepower of a 50 horsepower motor.

It is important to note that research publications such as those by Umans, Zipse, and Baghzouz & Cox all based their results on a parameter mathematical model that accounted for only fundamental harmonics of magnetic flux and currents. In contrast, I have used a transient FEA formulation that is able to account for the complex harmonic content of flux, currents, etc. This type of FEA test provides more specific and accurate data to benchmark the various motor designs. In addition, physical tests were conducted on an electric motor embodying the present invention and compared to a standard design motor.

The standard electric motor used for the physical tests was a Baldor model 10F315X909X2. This same model motor was rewound according to the parameters of the present invention and the results were compared to the standard electric motor. These physical tests confirmed the results of the FEA tests. The FEA test results show that the Wanlass design, the Goche design, and the Roberts design do not perform as well as the electric motor of the present invention. The Wanlass, the Goche, and the Roberts designs have various shortcomings when compared to a standard electric motor design, which does not have dual windings.

In the FEA tests, an identical amount of copper wire is provided in all designs. The capacitors for each design are optimized to achieve near unity PF. The present invention motor and Goche utilized a 75 µF. capacitor per line, the Wanlass design utilized a 100 µF capacitor per main phase as described by Wanlass, and the Roberts design utilized a 150 µF capacitor per phase.

In the Wanlass design the capacitors are in a Delta connection, however, in the Goche design and in the present invention the capacitors are connected in series with the auxiliary winding as shown in FIGS. 5-8. In the Roberts design capacitors are connected in parallel to a second winding which is then connected in series to the first winding.

In the FEA analysis, the results of which are in Tables 7a and 7b below, the power produced or output power, has been equalized across the range of motor designs to 37,285 W, or 50 hp, to provide a simple comparison in terms of efficiency.

TABLE 7a

|  | R100 | D100 | W100 | G100 | Rbrt 100 |
| --- | --- | --- | --- | --- | --- |
| System Input Power, Watt | 40,915 | 40,600 | 40,925 | 41,428 | 41,550 |
| Output Power, Watt | 37,285 | 37,285 | 37,285 | 37,285 | 37,285 |
| Motor Input Power, W | 39,700 | 39,699 | 40,031 | 40,503 | 40,588 |
| Main* winding (direct)Power, W | N/A | 32,050 | 16,961 | 37,770 | 20,053 |
| Auxiliary** winding Power, W | N/A | 5,235 | 20,323 | −486 | 17,230 |
| Power of Main (direct)% | N/A | 86% | 45% | 101% | 54% |
| Torque, Nm | 200.6 | 200.6 | 200.6 | 201.7 | 198.5 |
| RPM | 1775 | 1775 | 1775 | 1765 | 1772 |
| Line Current, Arms | 59.4 | 51 | 50.9 | 51.3 | 52.8 |
| Motor Losses, Watt | 2,415 | 2,414 | 2,746 | 3,218 | 3,303 |
| Motor only Efficiency | 93.9% | 93.9% | 93.1% | 92.1% | 91.9% |
| Cable Loses, Watt | 1,215 | 901 | 874 | 926 | 963 |
| Capacitor Vrms | N/A | 369 | 458 | 466 | 312 |
| Cable Voltage Drop, Vrms | 6.4 | 5.9 | 5.8 | 5.9 | 6.1 |
| System Power Factor, % | 89.6% | 98.2% | 99.8% | 100.0% | 99.7% |

TABLE 7a-continued

|  | R100 | D100 | W100 | G100 | Rbrt 100 |
|---|---|---|---|---|---|
| System Efficiency, % | 91.1% | 91.8% | 91.1% | 90.0% | 89.7% |
| System Eff. Improvement | 0 | 0.71% | 0.0% | −1.13% | −1.39% |

TABLE 7b

|  | R25 | D25 | W25 | G25 | Rbrt 25 |
|---|---|---|---|---|---|
| System Input Power, Watt | 10,653 | 10,505 | 11,122 | 10,579 | 10,926 |
| Output Power, Watt | 9,321 | 9,321 | 9,321 | 9,321 | 9,321 |
| Motor Input Power, W | 10,424 | 10,415 | 11,007 | 10,452 | 10,838 |
| Main* winding (direct)Power, W | N/A | 3,645 | −11,611 | 9,747 | 3,417 |
| Auxiliary** winding Power, W | N/A | 5,675 | 20,931 | −425 | 5,904 |
| Power of Main (direct)% | N/A | 39% | −125% | 105% | 37% |
| Torque, Nm | 49.6 | 49.6 | 49.6 | 49.7 | 49.6 |
| RPM | 1794 | 1794 | 1794.3 | 1792 | 1794 |
| Line Current, Arms | 25.8 | 16.2 | 18.2 | 19.2 | 16.0 |
| Motor Losses, Watt | 1,102 | 1,094 | 1,686 | 1,131 | 1,517 |
| Motor only Efficiency | 89.4% | 89.5% | 84.7% | 89.2% | 86.0% |
| Cable Loses, Watt | 230 | 91 | 114 | 127 | 88 |
| Capacitor Vrms | N/A | 376 | 466 | 477 | 313 |
| Cable Voltage Drop, Vrms | 2.8 | 1.8 | 1.8 | 2.1 | 1.7 |
| System Power Factor, % | 58.5% | 95.5% | 94.7% | 82.0% | 96.1% |
| System Efficiency, % | 87.5% | 88.7% | 83.8% | 88.1% | 85.3% |
| System Eff. Improvement | 0 | 1.23% | −3.69% | 0.61% | −2.18% |

At 100% of the rating (Table 7a), the motor of the present invention obtains a system efficiency of 91.8%, compared to 91.1% with the Wanlass design, 90.0% with the Goche design, 89.7% with the Roberts design, and 91.1% with a standard motor. At 25% of the rating, the motor of the present invention obtains a system efficiency of 88.7%, compared to 83.8% with the Wanlass design, 88.1% with the Goche design, 85.3% with the Roberts design, and 87.5% with a standard motor.

Tables 7a and 7b also show the dramatic difference in cable losses between the present invention, a standard design electric motor, and the other dual winding motors. The present invention electric motor reduces cable losses and improves system efficiency by 0.71% at 100% of the full load rating and 1.23% at 25% of the full load rating over a standard design electric motor. This is because the motor losses in the present invention either match or are below those of the standard design electric motor. Further, the Wanlass, Goche, and Roberts designs don't take full advantage of a high PF and reduced cable losses, as their designs have higher motor losses.

TABLE 7c

| D-design System Energy savings | | |
|---|---|---|
| P Syst Save, W | 100% Load | 25% Load |
| D vs R | −316 | −148 |
| D vs W | −326 | −616 |
| D vs G | −829 | −74 |
| D vs Rbrt | −950 | −421 |

Further, Table 7c illustrates the power savings, in Watts, of the present invention (D) over a standard motor (R), the Wanlass design (W), the Goche design (G), and the Roberts design (Rbrt). For example, the first entry in Table 7c of −316 means that the present invention motor required 316 Watts less of input power than the standard motor to produce the same power output.

Moreover, as can be seen from the results above in Tables 7a, 7b, the motor embodying the Goche design does not obtain near unity PF over all the range of loads, and even produces a leading PF at low loads. The Goche design also produces greater losses in the components of the motor and throughout the motor for the full range of loads.

Further, the Goche design capacitor voltage is significantly higher than that of the present invention and it produces even higher voltage (see FIG. 11) when it is deenergized. This results in a voltage across the capacitors much higher than the rated voltage of the machine. Typically higher voltage capacitors are significantly more expensive.

As with the other design comparisons, the resulting gains in efficiency for the present invention over the Roberts design are illustrated in Tables 7a-7c. The energy savings and efficiency gains of the present invention over Roberts are 950 W and 2.1% at 100% of the full load rating, and 421 W and 3.4% at 25% of the full load rating.

Further, it should be noted that according to FEA results, the Goche and Roberts design would not be able to maintain a Service Factor ("SF") similar to the standard, Wanlass, and present invention designs. At 100% load the motor losses of the Goche design are about 33% higher than the other designs while the losses of the Roberts design are even higher. The SF of a typical electric motor is 1.25. Typically motor losses increase by 50% versus full load to achieve a 1.25 overload. That means the motor losses of the Goche design would be 200% versus the standard machine at full load. Accordingly, Goche and Roberts would likely suffer overheating of the motor under standard conditions.

One of the unique properties of the present invention is the optimization of the winding power balance as a function of rotation direction for the motor. Table 8 below demonstrates the quantitative differences of several key motor characteristics when the power balance rules are not properly applied.

TABLE 8

Line swap Reversing D-Design vs. Wanlass, no Auxiliary Reconnection

| | W100Ni | W25Ni | D100Ni | D25Ni |
|---|---|---|---|---|
| System Input Power, Watt | 43,088 | 11,251 | 41,297 | 10,788 |
| Output Power, Watt | 37,285 | 9,321 | 37,285 | 9,321 |
| Motor Input Power, W | 42,145 | 11,146 | 40,368 | 10,691 |
| Main* winding (direct)Power, W | 56,379 | 31,222 | 43,728 | 15,627 |
| Auxiliary** winding Power, W | −19,095 | −20,229 | −6,443 | −2,101 |
| Power of Main (direct)% | 151% | 284% | 117% | 116% |
| Torque, Nm | 201.8 | 49.7 | 200.65 | 49.61 |
| RPM | 1764 | 1792.1 | 1774.4 | 1794.1 |
| Line Current, Arms | 52.3 | 17.4 | 51.9 | 16.8 |
| Motor Losses, Watt | 4,860 | 1,825 | 3,082 | 1,370 |
| Motor only Efficiency | 88.5% | 83.6% | 92.4% | 87.2% |
| Cable Loses, Watt | 944 | 120 | 929 | 97 |
| Capacitor Vrms | 440 | 455 | 364.5 | 373.2 |
| Cable Voltage Drop, Vrms | 6.0 | 2.1 | 6.0 | 1.9 |
| System Power Factor, % | 99.5% | 82.0% | 98.2% | 94.6% |
| System Efficiency, % | 86.5% | 82.7% | 90.3% | 86.4% |
| System Eff. Improvement | −4.60% | −4.76% | −0.84% | −1.10% |

Table 8 shows the situation when the phase leads of the power source are swapped and the connections of the main and auxiliary windings are not changed. This is a suboptimal connection that would result if the leads are improperly connected.

The present invention motor is labeled D100Ni and D25Ni for 100% and 25% loads respectively. Similarly, the Wanlass design is labeled W100Ni and W25Ni for 100% and 25% loads respectively. As can be seen in Table 8 the average power of the auxiliary windings is reversed, meaning the auxiliary windings act as a brake, although the severity in the Wanlass design is more dramatic than in the present invention.

The performance contrast between the present invention motor and the Wanlass design are stark with regard to the connection illustrated in Table 8. The motor losses of Wanlass design rose 77%, from 2,746 W to 4,860 W, compared to the motor losses before the incorrect connection. However, in the present invention the motor losses rose only 28%, 2,414 W to 3,082 W, compared to the proper connection. It should be noted that the design of the Baldor model 10F315X909X2 motor allows for a maximum cooling capacity of 4,110 Watts. The FEA results for W100Ni (Wanlass) at full load, shown in Table 8, significantly exceeds this value. This 18% overload would likely lead to premature failure at full load, whereas in the present invention the increases in losses is undesirable, but within the cooling capability of the motor design.

Figure 14:
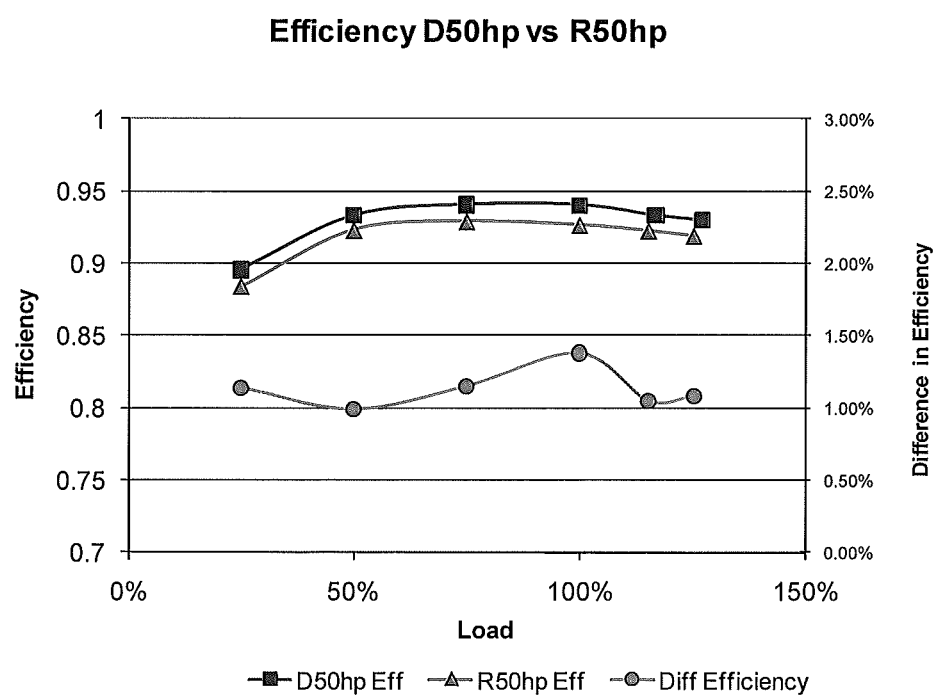
FIG. 14 is a graph comparing a 50 horsepower electric motor embodying the present invention, and a standard electric motor regarding field test data of efficiency.
Figure 15:
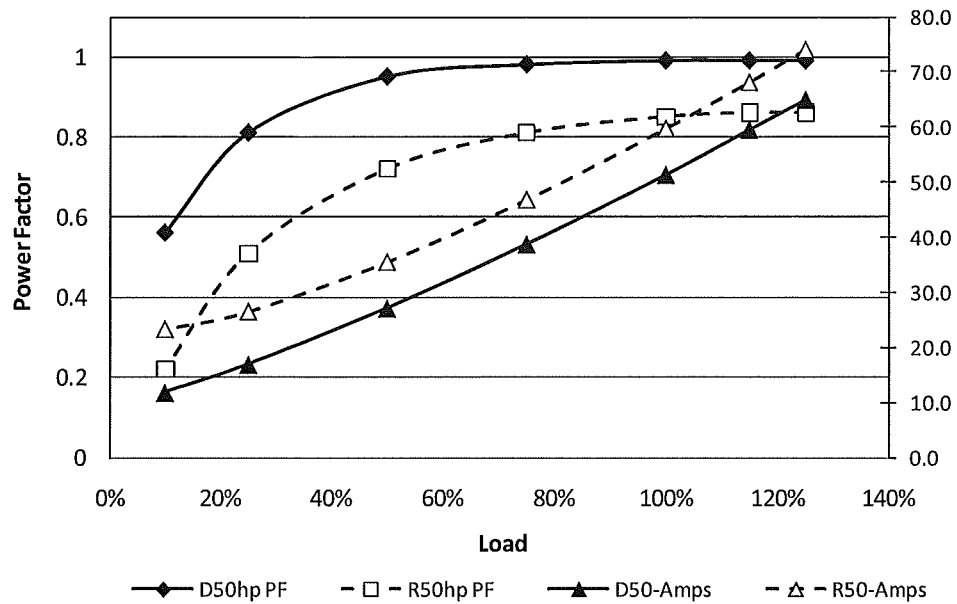
FIG. 15 is a graph comparing a 50 horsepower electric motor embodying the present invention, and a standard electric motor regarding field test data of PF and current.

Furthermore, FIGS. 14 and 15 show graphical comparisons of test data of an off the shelf 50 horsepower Baldor model 10F315X909X2 versus the same model, but rewound motor according to the present invention, represented again as "D," and a standard motor, represented again as "R." FIG. 14 demonstrates the increase in motor efficiency that the D design has over the R design from a load range of 25% up to 125%. The tests were performed according to the IEEE 112B standard. The R design motor was a brand new, off the shelf motor and the D design motor was rewound according to the present invention. It should be noted that special attention was taken to maintain an identical amount of slot fill and copper in both motors. Further, FIG. 15 shows the benefits that the D design motor compared to the R design motor in terms of PF and current draw within a load range of 10% up to 125%.

The gains in motor efficiency of the present invention motor are rather substantial over the standard electric motor. The present invention is 1% more efficient than the standard motor at 50% of full load and 1.4% more efficient at 100% of full load. Note that the curve with circular marks represents the difference in efficiency between the D and R designs.

Based on the results of the IEEE 112B testing, the main reason for gain in motor efficiency was the reduction in core losses, stray load losses, and rotor losses. The IEEE 112B test procedure does not account for the cable losses that are sensitive to the amount of current consumed by the motor. One skilled in the art will recognize from FIG. 14 that the D motor's efficiency gain would be even more significant in a real life application, where cable losses can be as high as 50% of the total losses in an electric motor.

The R design motor was a standard efficiency Energy Policy Act ("EPACT") machine. The gain of 1.4% in efficiency of the present invention motor at nominal or full load elevates that motor to within National Electric Manufacturers Association ("NEMA") Premium standards. According to data from the Electrical Apparatus Service Association ("EASA"), rewound motors typically have 0.5%-0.6% efficiency reduction in comparison with an new, off the shelf machine. Therefore, the efficiency of the D design motor would be even greater if it was a new off the shelf machine instead of a rewound motor.

Additionally, similar gains in efficiency are typically achieved by adding active materials, such as copper and steel in the windings of the motor. Typical a NEMA Premium motor has 10% to 15% more of these materials in addition to better core material. However, in the present invention all active materials are identical. Therefore, the present invention motor design has the potential to lead to significant cost advantages since motor efficiency is on par with the NEMA Premium standard, while the materials costs are the same as that of a standard efficiency EPACT motor.

Figure 16:
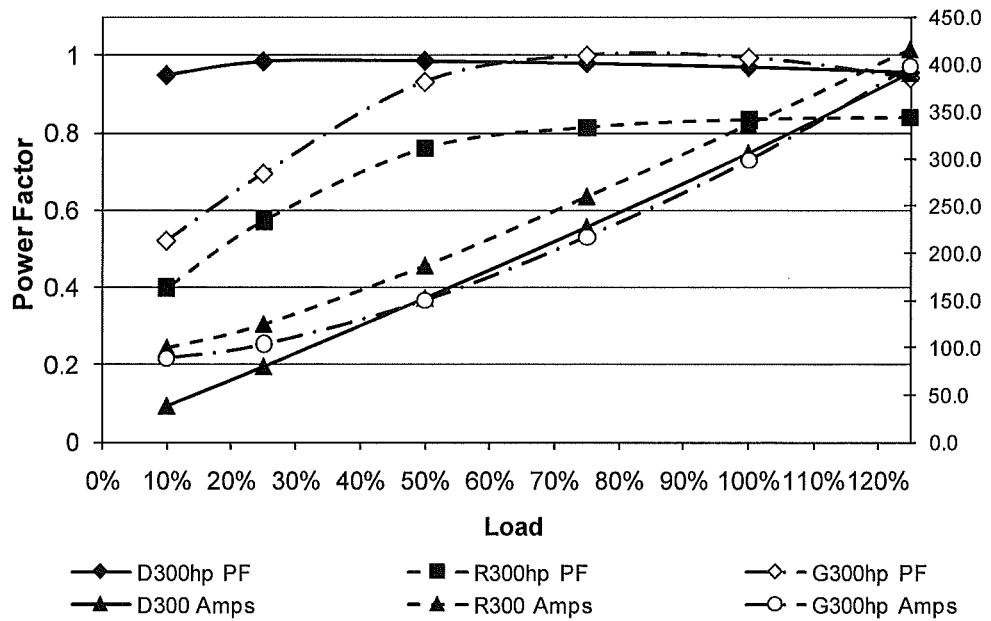
FIG. 16 is a graph comparing a 300 horsepower electric motor embodying the present invention, a standard electric motor, and a Goche design regarding field test data of PF and current.

Tests have also been conducted comparing a 300 hp embodiment of the present invention ("D300") to a standard 300 hp electric motor ("R300"), and to a 300 hp electric motor embodying the Goche design ("G300") over a load range up to 125%. FIG. 16 demonstrates that the present invention motor displays a flatter PF curve, over its full range of loads, than all other designs. Further, the present invention motor performs significantly better than the other designs in terms of PF and current draw up to around 50%.

TABLE 9

| Torque and Current @ 1680 RPM | | | | | |
|---|---|---|---|---|---|
| | R | D | W | G | Robrt |
| Torque, Nm | 553 | 547 | 505 | 427 | 403 |
| Current, Arms | 194 | 183 | 168 | 135 | 155 |

Table 9 shows the results of an FEA for a set value of RPM that is close to the breakdown torque of a standard motor design (R), a motor embodying the present invention (D), a Wanlass design (W), a Goche design (G), and a Roberts design (Robrt). Table 9 uses a similar nomenclature to the previous Tables. From this Table it can be seen that while the Wanlass, Goche, and Roberts designs display lower current at 1680 rpm, those designs also produce significantly less torque.

While I have shown and described certain present preferred embodiments of my electric motor it is to be distinctly understood that the invention is not limited thereto but may be otherwise variously embodied and practiced within the scope of the following claims.

The invention claimed is:

1. A polyphase electric motor comprising:
a rotor;
a stator with a plurality of slots;
a plurality of main windings installed in the plurality of slots of the stator, a first main winding of the plurality of main windings corresponding to a selected phase of an available alternating current power source; and
a plurality of auxiliary windings installed in the plurality of slots of the stator, a first auxiliary winding of the plurality of auxiliary windings corresponding to the selected phase of the available alternating current power source, the plurality of auxiliary windings being connected to motor terminals of the polyphase electric motor through a plurality of capacitors, the plurality of auxiliary windings and the corresponding capacitors being connected in parallel to the plurality of main windings; and
wherein the first main winding of the selected phase and the first auxiliary winding of the selected phase are offset by about 60 to about 120 electrical degrees; and
wherein the capacitors and windings are sized and configured to provide a power of the plurality of main windings that is at least 75% of a total power of the polyphase electric motor at 100% of a full load rating of the polyphase electric motor and the power of the plurality of main windings is motoring at 25% of the full load rating.

2. The polyphase electric motor of claim 1 wherein each of the plurality of main windings and each of the plurality of auxiliary windings have current flowing that creates a first, a second, a third, and a fourth rotating Magnetomotive Force ("MMF"), and wherein the first MMF is created by a fundamental frequency current flowing in the main windings, the second MMF is created by a fundamental frequency current flowing in the auxiliary windings, the third MMF is created by interactions between the fundamental frequency current flowing in the main windings and the fundamental current flowing in the auxiliary windings, and the fourth MMF is created by interactions between a third harmonic frequency current flowing in the main windings and a third harmonic frequency current flowing in the auxiliary windings, and wherein the first, second, third, and fourth MMF all rotate in the same direction.

3. The polyphase electric motor of claim 1 wherein the polyphase electric motor is a three phase electric motor and wherein the stator has 72 slots and the first auxiliary winding is offset by 9 slots in relation to the first main winding.

4. The polyphase electric motor of claim 1 wherein the polyphase electric motor is a three phase electric motor and wherein the stator has 48 slots and the first auxiliary winding is offset by 6 slots in relation to the first main winding.

5. The polyphase electric motor of claim 1 wherein the plurality of main windings are installed closer to a backiron of the stator than the plurality of auxiliary windings in the slots of the stator.

6. The polyphase electric motor of claim 1 wherein the plurality of auxiliary windings are installed closer to a back-iron of the stator than the plurality of main windings in the slots of the stator.

7. The polyphase electric motor of claim 1 further comprising a mechanical input device connected to the rotor enabling the electric motor to generate electricity.

8. The polyphase electric motor of claim 1 wherein the plurality of main windings and the plurality of auxiliary windings are sized and configured such that when the polyphase electric motor is connected to the available alternating current power source the polyphase electric motor rotates in a clockwise direction.

9. The polyphase electric motor of claim 1 wherein the plurality of main windings and the plurality of auxiliary windings are sized and configured such that when the polyphase electric motor is connected to the available alternating current power source the polyphase electric motor rotates in a counter clockwise direction.

10. The polyphase electric motor of claim 1 wherein the first main winding of the selected phase and the first auxiliary winding of the selected phase are offset by about 90 electrical degrees.

11. A method of making a polyphase electric motor, the method comprising:
placing a plurality of main windings into a plurality of slots of a stator;
placing a plurality of auxiliary windings into the plurality of slots of the stator;
installing a plurality of capacitors such that the plurality of auxiliary windings being connected to motor terminals of the polyphase electric motor through the plurality of capacitors; and
installing the plurality of auxiliary windings and the corresponding capacitors in parallel to the plurality of main windings; and
wherein a first main winding of the plurality of main windings corresponds to a selected phase lead of the polyphase electric motor and a first auxiliary winding of the plurality of auxiliary windings corresponds to the selected phase lead; and
wherein the first main winding and the first auxiliary winding are offset by about 60 to about 120 electrical degrees; and
wherein the capacitors and windings are sized and configured to provide a power of the plurality of main windings that is at least 75% of a total power of the polyphase electric motor at 100% of a full load rating of the polyphase electric motor and the power of the plurality of main windings that is motoring at 25% of the full load rating.

12. The method of claim 11 wherein each of the plurality of main windings and each of the plurality of auxiliary windings are sized and configured such that when the polyphase electric motor connected to an alternating current power source, each of the plurality of main windings and each of the plurality of auxiliary windings have current flowing that creates a first, a second, a third, and a fourth rotating Magnetomotive Force ("MMF"), and wherein the first MMF is created by a fundamental frequency current flowing in the main windings, the second MMF is created by a fundamental frequency current flowing in the auxiliary windings, the third MMF is created by interactions between the fundamental frequency current flowing in the main windings and the fundamental current flowing in the auxiliary windings, and the fourth MMF is created by interactions between a third harmonic frequency current flowing in the main windings and a third harmonic frequency current flowing in the auxiliary windings, and wherein the first, second, third, and fourth MMF all rotate in the same direction.

13. The method of claim 11 wherein the polyphase electric motor is a three phase electric motor and wherein the stator has 72 slots and the first auxiliary winding is offset by 9 slots in relation to the first main winding.

14. The method of claim 11 wherein the polyphase electric motor is a three phase electric motor and wherein the stator has 48 slots and the first auxiliary winding is offset by 6 slots in relation to the first main winding.

15. The method of claim 11 wherein the plurality of main windings are installed closer to a backiron of the stator than the plurality of auxiliary windings in the slots of the stator.

16. The method of claim 11 wherein the plurality of auxiliary windings are installed closer to a backiron of the stator than the plurality of main windings in the slots of the stator.

17. The method of claim 11 further comprising connecting a mechanical input device enabling the polyphase electric motor to generate electricity.

18. The method of claim 11 wherein the plurality of main windings and the plurality of auxiliary windings are sized and configured such that when the plurality of main windings and the plurality of auxiliary windings are connected to an alternating current power source the polyphase electric motor rotates in a clockwise direction.

19. The method of claim 11 wherein the plurality of main windings and the plurality of auxiliary windings are sized and configured such that when the plurality of main windings and the plurality of auxiliary windings are connected to an alternating current power source the polyphase electric motor rotates in a counter clockwise direction.

20. The method of claim 11 wherein the first main winding corresponding to the selected phase lead and the first auxiliary winding corresponding to the selected phase lead are offset by about 90 electrical degrees.

* * * * *